United States Patent [19]
Philibert et al.

[11] 3,783,178
[45] Jan. 1, 1974

[54] EXPANSION JOINT FOR CONNECTING RIGID CONDUIT WITH GROUNDING CONTINUITY

[75] Inventors: Robert A. Philibert, Rockville Centre; Robert Polimine; Eversly V. Parkins, both of Brooklyn, all of N.Y.

[73] Assignee: General Signal Corporation, Rochester, N.Y.

[22] Filed: Aug. 3, 1972

[21] Appl. No.: 277,828

[52] U.S. Cl.................. 174/86, 174/78, 339/14 R, 285/302
[51] Int. Cl............................................ H02g 15/08
[58] Field of Search............... 174/35 GC, 78, 84 R, 174/86, 65 G, 12 R; 285/382.7, 354, 343, 342, 348, 302; 339/14 R

[56] References Cited
UNITED STATES PATENTS

| 2,468,783 | 5/1949 | Schwartz | 174/35 GC UX |
| 3,154,632 | 10/1964 | Browne | 174/78 X |
| 3,451,483 | 6/1969 | Van Houtte et al. | 285/302 X |

FOREIGN PATENTS OR APPLICATIONS

| 94,560 | 7/1959 | Norway | 174/78 |

*Primary Examiner*—Darrell L. Clay
*Attorney*—George W. Killian et al.

[57] ABSTRACT

In order to protect personnel, promote safety and prevent equipment damage it is conventional for electrical conduits to be grounded with a high integrity ground. Because of the expansion and contraction which may take place in electrical conduits it is sometimes necessary to provide telescoping or expansion joints. The present invention relates to a rain-tight expansion joint which provides a high integrity ground without the use of an external bonding jumper. A grounding ring is included in a head assembly and a controlled pressure is applied so that the grounding ring makes firm electrical contact with the head portion of the expansion joint and with the conduit. Grounding rings fabricated from sheet metal and tubular stock are disclosed. An O-ring is used in the head assembly to contact the conduit and protect the interior of the expansion joint from the weather and atmospheric conditions. Means are provided for limiting the travel of the conduit so that the tapered and threaded end thereof cannot enter the sliding contact region and jeopardize the integrity of the ground.

9 Claims, 3 Drawing Figures

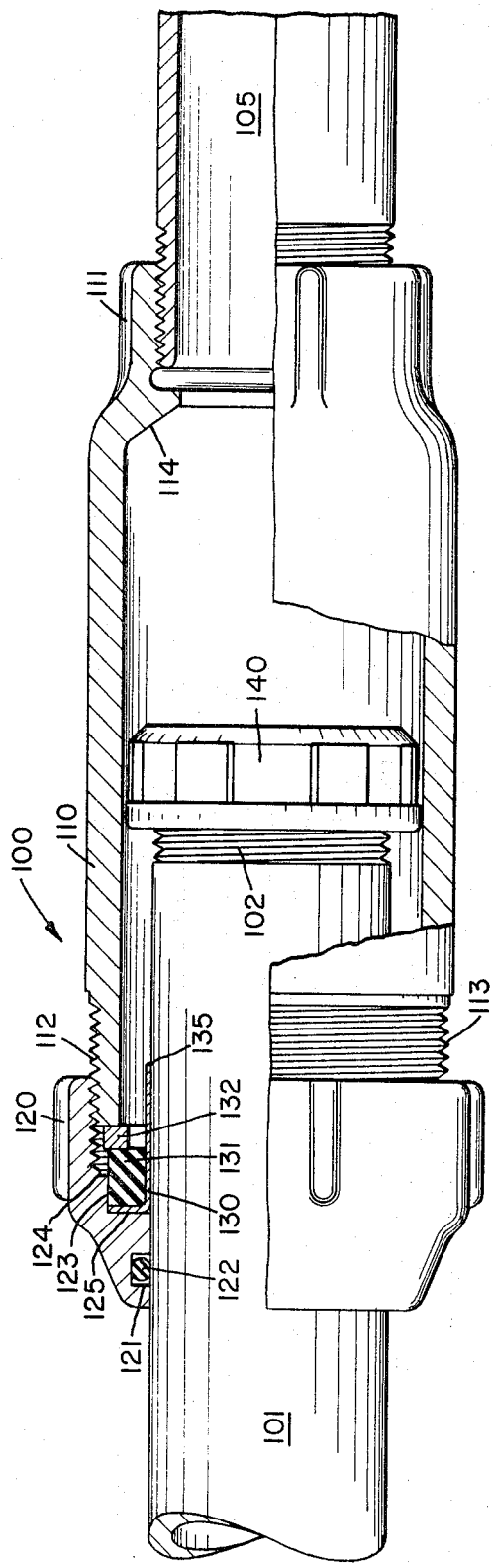
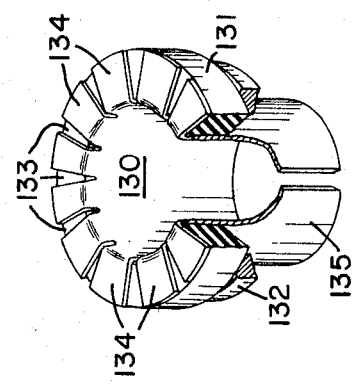
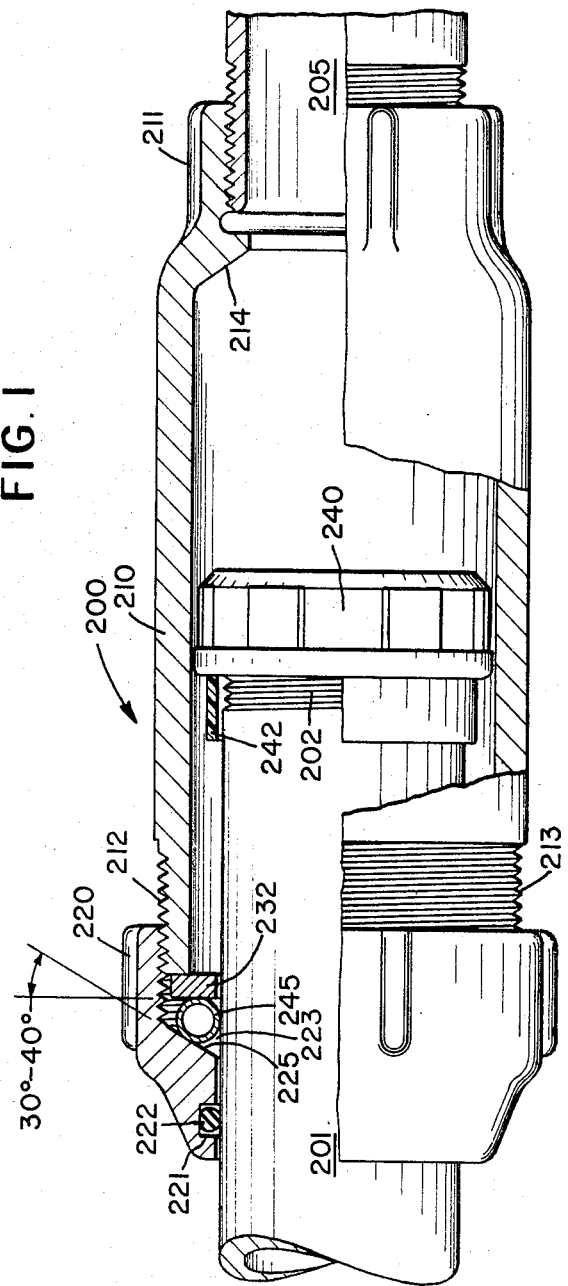

EXPANSION JOINT FOR CONNECTING RIGID CONDUIT WITH GROUNDING CONTINUITY

BACKGROUND OF THE INVENTION

In order to provide for the safety of personnel and to reduce the probability of damage to electrical conductors which carry large currents and deliver substantial power it is customary to enclose such conductors in a metallic conduit. In order to further reduce the probability of electrical shock to personnel who must work with such equipment it is conventional to connect such conduits to ground potential. More specifically, the conduit is grounded by means of a high integrity circuit which has the capability of carrying sufficient current to trip circuit breakers without thermal damage to the conduit. The high integrity ground must be maintained through conduit joints, meter boxes, junction boxes, expansion joints, distribution boxes etc. There may be multiple ground connections of the conduit including incidental grounds by contact with grounded metal supporting structures. In order to assure that all sections of a conduit are at ground potential it is necessary to provide high integrity electrical joints everywhere that two sections of conduit are coupled together. Where standard threaded sleeves are used to join two conduit sections a high integrity electrical connection is readily obtained. However, in certain locations, and under certain conditions, conduit sections may be subjected to wide temperature variations either as a result of the atmosphere or as a result of the heating of the wires within the conduit, in consequence of the current flowing in the wires. In order to prevent the conduits from buckling as a result of thermal or mechanical expansion and contraction it is conventional to provide telescoping, or expansion, joints as may be required. Because some type of sliding motion is required for expansion joints it has been difficult to provide high integrity electrical continuity between the two members which move relative to each other without the use of a flexible bonding jumper which is rigidly coupled to the conduit on each side of the expansion joint.

As shown in the Frank L. Browne patent, U.S. Pat. No. 3,154,632, issued Oct. 27, 1964, expansion joints have been provided which do not require external bonding jumpers. However, the prior art expansion joints had various limitations which made them satisfactory for use only for limited applications. For example, the copper braid mesh used to provide the ground continuity in the cited Browne patent will tend to oxidize and/or deteriorate if exposed to certain atmospheric conditions. In addition, under selected atmospheric conditions the conduit with which the copper braid was to make an electrical contact would tend to oxidize thereby reducing the effectiveness and integrity of the electrical connection between the copper braid of the expansion joint and the conduit. Although the conduit in the vicinity of an expansion joint of the Browne variety should not be painted such conduit was occasionally painted after it was installed. The result was a loss or derogation of electrical continuity from the conduit on one side of the joint to the conduit on the other side thereby creating a potential hazard to the operating personnel.

The expansion joint of the present structure has been designed to overcome the difficulties which were inherent in the prior art structures. More specifically, the present structure is designed to assure a high integrity ground from one side to the other of the expansion joint for both indoor and outdoor use. In addition, the present structure has the capability of scraping and removing paint, or oxide, which may exist on the telescoping section of the conduit to thereby assure maintenance of the high integrity ground from one section of conduit through the telescoping joint to the other section of conduit. In addition, the present structure seals the interior of the telescoping joint from atmospheric conditions.

For the purpose of this specification a high integrity ground connection may be defined as a connection which will be maintained irrespective of adverse conditions and which will be capable of conducting any current which the connection may be required to conduct without thermal damage to the connection and/or conduction medium. Furthermore a high integrity ground connection will meet all the requirements of the National Electrical Code and conventions of the trade.

SUMMARY OF THE INVENTION

The present invention provides an expansion fitting for electrical conduit and includes means for excluding ambient atmospheric conditions from the interior of the expansion joint. Such sealing makes the expansion joint suitable for use both indoors and outdoors. Special types of grounding rings are employed to assure adequate contact pressure and a high integrity electrical connection between the telescoping section of the conduit and the expansion fitting. In addition, the grounding ring is provided with means so that it can break through, or shear away, paint or oxide on the conduit and assure maintenance of the high integrity electrical connections. In addition, means is provided to prevent excessive telescoping which might cause the tapered end of the conduit inside the expansion joint to approach the grounding ring and jeopardize the integrity of the ground. Stop means are included within the expansion fitting to limit the pressure which may be applied between the grounding ring and the associated conduit so that the pressure will not make an objectionable indentation on the conduit and possibly derogate the integrity of the connection.

It is an object of the present invention to provide a new and improved expansion fitting for joining a section of electrical conduit to another member.

It is a more specific object of the present invention to provide a new and improved expansion fitting for joining a section of electrical conduit which may be subject to relative longitudinal motion and which may be used under a wide variety of atmospheric conditions.

It is another object of the invention to provide an expansion joint which maintains a high integrity electrical connection between a section of electrical conduit and the expansion joint without the need for a bonding jumper.

It is another object of the present invention to provide a grounding ring in an electrical expansion joint which is capable of removing oxide and/or paint from the contacted surface of conduit in response to the sliding motion of the conduit.

It is a more specific object of the invention to provide a means which limits the motion of the conduit in the direction to withdraw it from the expansion joint whereby the tapered end of the conduit is inhibited from entering the region of the grounding ring and/or the sealing ring.

It is another object of the invention to provide pressure control means which assures that the grounding ring will apply adequate pressure to the conduit to assure a high integrity electrical connection but will not apply so much pressure as to deform the conduit.

It is another object of the invention to provide appropriate designs and proportions to provide force components in the directions required to meet the objectives.

It is another object of the invention to provide a form of grounding ring which is best adapted to work with the conduit size with which it is associated.

It is another object of the invention to satisfy the foregoing objects by use of an economical structure which is convenient and simple to use and which meets the Underwriters' Laboratories requirements and those of the National Electrical Code.

BRIEF DESCRIPTION OF THE DRAWING

FIG. 1 shows a cutaway view of one form of an expansion joint for connecting two sections of rigid conduit;

FIG. 2 shows a cutaway view of another form of an expansion joint for connecting two sections of rigid conduit;

FIG. 3 shows a perspective view of the grounding ring used in the structure of FIG. 1.

DESCRIPTION OF THE PREFERRED EMBODIMENTS

It is believed that the invention together with its structural parts and their interaction one with the other can best be understood from a consideration of the drawing taken together with the following specification. Since the structures of FIGS. 1 and 2 have similar functions and are made up of many elements which are similar, the similar elements are given identical numerical designations except for the first digit. That is, elements in FIG. 1 all start with the digit 1 while elements of FIG. 2 start with the digit 2. Thus, the elements of FIG. 2 which most closely correspond with similar elements of FIG. 1 are given the same last two digits. Accordingly, except in the few specific areas where there is a difference in structure, the description of one figure may be read on the structure of the other figure by substituting different first digits for the elements to which reference is made.

Considering now more specifically the structure shown in FIG. 1 there will be seen an expansion fitting 100 for coupling together two sections of rigid conduit 101 and 105. It should be understood that a modified version of the expansion fitting 100 could be employed for coupling a section of rigid conduit 101 to a wall member (not shown) instead of to a second section of rigid conduit 105. The expansion fitting 100 includes a generally cylindrical body section 110 which at one end 111 is suitably formed to facilitate connection to rigid conduit 105 or some other member as may be expedient. The method of joining the conduit 105 to the end 111 of body section 110 will normally comprise a technique which does not admit of relative longitudinal motion between the two elements after the joining has been completed. Such technique may involve a threaded fitting as shown in FIG. 1 but could comprise any suitable form of compression fitting, welding, soldering or brazing, etc.

The coupling at end 111 of the body section 110 could be of the same general character as the type to be described with respect to the end 112 of the body section 110.

The end 112 of the body section 110 is threaded with threads 113 to facilitate the coupling of the head 120 to the body section 110. As may be seen the head member 120 has a first recessed area 121 which is adapted to retain an O-ring 122 which may be coated with a silicon grease. The dimension of the recess 121 and the O-ring 122 inserted therein are such that when a section of rigid conduit 101 is inserted through the opening of the head 120 there will be a sealing connection between the O-ring 122 and the conduit 101 for excluding water and/or atmospheric contaminants from entering the interior of the body section 110. The recess 121 has a dimension parallel to the longitudinal direction of the rigid conduit 101 which is greater than the diameter of the material of the O-ring 122 in order to facilitate compression and/or rolling motion of the O-ring 122 in response to relative longitudinal motion between the rigid conduit 101 and the head 120. There is another recess 123 in the head 120 which serves a function to be described hereinbelow. The interior of the head 120 is threaded to mate with the threads 113 of the body section 110. It should be observed that the recess 123 has a lesser diameter than the threaded section of the head 120, thereby forming a wall 124 between the recess 123 and the threaded section of the head 120. Accordingly, it will be evident that it would be impossible to thread the body section 110 and the end 112 thereof into the head 120 any further than the wall 124. Accordingly, the recess 123 cannot be reduced below a predetermined volume which is a function of the various dimensions. Contained within the recess 123 is a grounding ring 130 which will be described more fully in connection with FIG. 3. Surrounding a portion of the grounding ring 130 is a compression grommet 131 which fits in the recess 123. Between the compression grommet 131 and the end 112 of the body section 110 is a pressure ring 132. As the body section 110 is screwed into the head section 120 the end 112 of the body section 110 will push the pressure ring 132 against the compression grommet 131 thereby squeezing the compression grommet 131 into the recess 123 and increasing the pressure of the grounding ring 130 against the rigid conduit 101 and against the wall 125 of the recess 123. By controlling the dimension of the recess 123 and the dimensions and material of the compression grommet 121 it is possible to control the maximum pressure that will be applied between the grounding ring 130 and the conduit 101.

Considering now more specifically FIG. 3 and the grounding ring 130 shown therein it will be seen that the grounding ring 130 may be conveniently and economically fabricated from a piece of sheet metal. A plurality of slits 133 may be made at one end of the sheet metal and the tabs 134 formed thereby bent over. Subsequently the sheet metal may be formed into a right circular cylinder with the tabs 134 formed by the slits 133 pointing away from the axis of the right circular cylinder of the grounding ring 130. The length of the tabs 134 will be no greater than the difference in radius between the rigid conduit 105 and the recess 123. The circumference of the grounding ring 130 will be no greater than the circumference at the outer diameter of the rigid conduit 101. Accordingly, the grounding ring 130 may be assembled into the head 120 together with the compression grommet 131 and the rigid conduit 101 inserted through the opening of the head 120. Subsequently the pressure ring 132 may be assembled into the head 120. Thereafter the bushing 140 may be threaded onto the conduit 101. The function of the bushing 140 will be described more completely hereinbelow. The body section 101 may now have its open end 112 slipped over the bushing 140 and threaded into the head 120 until the end 112 of the body section 110 comes in contact with the pressure ring 132. In response to continued tightening of the head 120 onto the body section 110 the pressure ring 132 will compress the compression grommet 131 and cause an increase in pressure between the grounding ring 130 and the conduit 101 and also increase the pressure between the tabs 134 of the grounding ring 130 and the wall 125 of the head 120. As previously suggested the maximum amount of pressure which may be applied between the elements will be a function of the dimensions of the recess 123 and the size and characteristics of the compression grommet 131 because the wall 124 limits the leftward motion of the pressure ring 132 and the volume into which the compression grommet 131 may be squeezed. The dimensions and characteristics are selected such that a high integrity electrical contact between the grounding ring 130 and the conduit 101, and between the grounding ring 130 and the head 120, is assured without making the pressure between the grounding ring 130 and the conduit 101 so great that the conduit 101 is deformed and/or the force required to induce relative motion between the conduit 101 and the body section 110 exceeds an acceptable maximum force value.

An acceptable maximum force value falls somewhere between the force that is required to overcome the pressure and friction between the grounding ring 130 and the conduit 101 which is required to assure a high integrity electrical contact, and that greater force which would result in the buckling of the conduit 101 instead of the relative longitudinal motion between the conduit 101 and the body section 110. If an expansion joint is not provided, and/or if the expansion joint fails to permit longitudinal motion it is possible for the expansion and/or contraction of the conduit to cause structural damage to the building or the conduit supports or switch gear etc. The allowable range of the force which is required to produce relative motion between the conduit section 101 and the body section 110 will vary with the dimensions and material of the conduit 101.

As is well known to those who are familiar with electrical expansion fittings the conduit 101 may be fabricated of a wide variety of metals. For example, the conduit 101 may be made of rolled steel which is galvanized; or it may be fabricated of aluminum or copper alloy.

Some metals of which the conduit 101 may be fabricated have a tendency to form an oxide which makes it difficult to achieve a high integrity electrical contact between the conduit 101 and the head 120 by means of the grounding rings 130 or 245. Accordingly, to assure the required high integrity electrical contact the pressure between the grounding ring 130 and the conduit 101 must be sufficient to break down any oxide film. Although the conduit 101 should not be painted in the vicinity of an expansion fitting it will occasionally happen that the conduit will be painted for corrosion protection or possibly for color coding to indicate the nature or function of the wires contained therein or just for aesthetic reasons. Because some conduits may be painted the pressures between the grounding ring 130 and the conduit 101 must be adequate to break and/or shear away any paint which may be on the conduit. The conduit 101 would not be painted prior to the assembly of the expansion fitting 100. The capability of the grounding ring 130 to break through an oxide film on the conduit 101, or to shear away paint on the conduit 101, may be enhanced by an appropriate selection of material and characteristics for the grounding ring 130. For example, the grounding ring 130 might have a roughened surface and/or sharp edges along the portions of the slits 133 which are parallel to the axis of the conduit 101.

In a long run of conduit subject to extensive expansion and contraction it is possible that it might be necessary to provide more than one expansion fitting. It is obvious that in such a situation all of the initial movement would take place at the expansion fitting which requires the minimum force to produce the relative longitudinal motion between the conduit 101 and the associated body section 110. If the direction of motion is such as to withdraw the conduit 101 from the body section 110 the bushing 140 threaded on the internal end of the conduit 101 will contact the end 135 of the grounding ring 130 and thereby limit the motion of the conduit 101 relative to the body section 110. Similar motion will then occur in another expansion joint. In addition, the bushing 140 and the extended end 135 of the grounding ring 130 prevent the threads 102 of conduit 101 from contacting the interior surface of the grounding ring 130 and possibly damaging said grounding ring and/or prevent the threads 102 from contacting and damaging the O-ring 122. In addition, if the end of the conduit 101 including the threads 102 came under the grounding ring 130 there is a possibility that the quality of the grounding connection would be derogated as a result of the reduced contact surface available and the fact that the end of the conduit 101 having the threads 102 is slightly tapered which would also result in reduced contact pressure between the grounding ring 130 and the conduit 101 thereby resulting in a possibly derogated grounding connection. The bushing 140 may be either a conducting or insulating bushing. Usually a simple and economical insulating bushing is employed. If desired, a special metal bushing 140 could be employed which has spring fingers (not shown) for contacting the interior surface of the body section 110 for providing an additional electrical grounding contact between the conduit 101 and the interior of body section 110.

The bushing 140 would ordinarily be formed so that it would protect the wires (not shown) which are inside the conduit 101 and extend through the body section 110 to the conduit 105. That is, the bushing 140 would protect the wires from any sharp edges which may exist on the end of the conduit 101 which includes the threads 102.

When there is expansion of the conduit to cause the direction of longitudinal motion of the conduit 101 to be in the direction to insert it into the body section 110 of the expansion fitting 100 the bushing 140 will contact the sloping edge 114 on the interior of the body section 110. This will limit the motion of the conduit section 101 with respect to the body section 110 and cause any further longitudinal motion which may be required, to take place in other expansion fittings. The edge 114 is made sloped rather than vertical in order to facilitate the pulling of wires through the conduit 101 and the expansion fitting to the conduit 105.

Considering now more specifically FIG. 2, there is shown therein a modified version of an expansion fitting 200 which has a marked similarity to the expansion fitting 100 of FIG. 1. Accordingly, elements of FIG. 2 which correspond most nearly with elements of FIG. 1 are given numerical designators which have the same last two digits as those shown in FIG. 1. For example, there is an expansion fitting 200, rigid conduit sections 201 and 205 with threads 202 on conduit 201. There is a body section 210 having an end 211 and an end 212 having threads 213 and an interior sloping surface 214. There is a head 220 having a recess 221 in which an O-ring 222 is located. In addition, there is a recess 223 having a wall 225. The head 220, as illustrated in FIG. 2, does not include a wall which corresponds to the wall 124 of FIG. 1. However, a head which is otherwise identical to head 220 could be designed which would include a wall similar in nature and function to the wall 124 of FIG. 1.

The principal point of distinction between the structures of FIGS. 1 and 2 resides in the nature of grounding ring. The grounding ring 245 of FIG. 2 is fabricated so that it has the shape of a hollow O-ring which is preferably cut so that the grounding ring 245 remains in one piece, and with the cut in a plane which is at right angles to the plane that would include the circular axis of the ring 245. Expressed differently the grounding ring 245 may be fabricated from a tube of appropriate length which is formed into the shape of a doughnut until the two ends of the tube nearly meet. The grounding ring could also be made of an appropriate length of a coiled spring; or could comprise two doughnut shaped tubes of different cross section diameters assembled within the recess 223; or the ring 245 could be of solid material.

The expansion fitting 200 includes a pressure ring 232 which is similar in function to the pressure ring 132 of FIG. 1. The expansion fitting 200 includes a bushing 240. In addition, the structure of FIG. 2 may also include a stop collar 242 which may be a simple conducting or nonconducting band which surrounds the conduit 201 and limits the relative motion of the conduit 201 and the body section 210 in the direction to withdraw the conduit 201 from the body section 210 so that the tapered end of the conduit cannot approach the zone of the grounding ring 245 or the O-ring 222. The stop collar 242 may be a continuous ring or a C-shaped member and/or it may be an integral part of the bushing 240 or a separate member.

By analogy with the structure of FIG. 1 it will be evident that when the elements of FIG. 2 are assembled and the head 220 is tightened on threads 213 of the body section 210 the end 212 will bear on the pressure ring 232 and thereby apply pressure to, and distort, the grounding ring 245. In order to provide an adequate ground connection between the conduit 201 and the head 220 it is necessary that the grounding ring 245 be urged towards both the conduit 201 and the wall 225 of head 220 with sufficient force to assure a high integrity electrical connection. The wall 225 is slanted in the direction as shown in order to produce a downward component of force on the grounding ring 245 in response to the tightening of the head 220 on the body section 210. That is, the angle of the slope of the wall 225 provides a component of force which urges the grounding ring 245 towards and into contact with the conduit 201. The magnitude of the angle of the slope of the wall 225 is such that if a line representing the slope of the wall in the plane of the drawing, were extended until it intersected with the vertical plane of the pressure ring 232 the angle of intersection would preferably be of the general order of 30° to 40°. With an angle of the general magnitude indicated it has been found that appropriate pressures will be applied between the grounding ring 245 and the conduit section 201 and between the grounding ring 245 and the head 220. If desired the wall 225 could be vertical and the plane of the pressure ring 232 sloped; or both the wall 225 and the pressure ring could have a slope. The important thing is to have a net force on the grounding ring to urge it into contact with the conduit 201.

In response to the tightening of the head 220 on the body section 210 the grounding ring 245 will be slightly distorted from its circular cross-section as shown in FIG. 2 and will assume an oval, or somewhat egg-shaped, cross-section with the larger end of the egg-shape closer to the axis of the conduit 201. The pressures and shapes involved will improve the integrity of the electrical contact between the grounding ring 245 and the conduit 201 and will also tend to break down any oxide film which may have formed on the conduit 201 and/or to break or shear away any paint which may have been placed on the conduit 201. The conductive material of which the grounding ring 245 is fabricated may vary depending upon the metal of which the conduit 201 and/or the head 220 is fabricated. Stainless steel tubing has been found to be satisfactory for most combinations of conduit and head material. Although it was suggested that the grounding ring 245 would not be a continuous ring it would be possible to use a continuous ring or to use a ring which has more than one cut, or to use a spring as previously mentioned.

The stop collar 242, as previously suggested, limits the motion of the conduit 201 in the direction to remove it from the body section 210 by contacting the pressure ring 232. The motion of the conduit section 201 in the other direction is limited by the same means as set forth with respect to the structure of FIG. 1.

Although the grounding ring 130 or the grounding ring 245 might be used with any size conduit it has been found that the grounding ring 135 is generally suitable for the smaller conduit diameters while the grounding ring 245 is superior for larger conduit sizes. That is, the grounding ring 135 is generally used with conduit sections of less than an inch and one-half in diameter while the grounding ring 245 is used with conduit sections having a diameter greater than one and one-half inches.

As previously suggested the head 220 could be fabricated with a wall which corresponds to the wall 124 of FIG. 1 so that the motion of the pressure ring 232 in the direction of the O-ring 222 would be limited. One reason for wanting to limit the extent of travel of the pressure ring 232 is to limit the pressure which is applied between the grounding ring 245 and the conduit 201. That is, if the pressure is too great the gounding ring 245 may deform the conduit 201 by creating an indentation thereon and thereby inhibit the sliding motion of the conduit 201 with respect to the body section 210.

It should be observed that in order to maintain the expansion fittings 100 or 200 so that they are weather-tight, it is necessary to use a high quality O-ring 122 or 222 and to very carefully control the dimension of the recess 121 or 221 so that the O-ring will maintain a sealing contact with the conduit. In a similar manner the dimensions of the recess 123 or 223 will tend to be critical particularly if a stop wall 124 is used as in FIG. 1, or an equivalent in FIG. 2.

While there has been shown and described what is considered at present to be the preferred embodiment of the invention, modifications thereto will readily occur to those skilled in the related art. For example, in another structure the wall 225 might be made vertical and the plane of the pressure ring 232 which contacts the grounding ring 245 might be sloped; or the plane of the pressure ring 232 might be sloped without altering the angle of the wall 225. Or the function of the pressure ring 232 and the stop collar 242 might be combined into a single piece. It is believed that no further analysis or description is required and that the foregoing so fully reveals the gist of the present invention that those skilled in the applicable art can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. An electrically conducting expansion joint comprising in combination:
   a. a body member having first and second ends coupling a section of rigid conduit to another member with said first end thereof coupled to said another member by a means which provides for high integrity electrical continuity between said body member and said another member;
   b. said body member having an internal size at its second end which is at least of sufficient size admitting a portion of said rigid conduit section therein;
   c. head coupling means coupling a head member to said body member and which provides electrical continuity between said body member and said head member and wherein said head member includes an opening receiving an end of said rigid conduit section therethrough;
   d. grounding ring confined between said head member and said rigid conduit section and encircling said rigid conduit section;
   e. pressure producing means confined between said head member and said grounding ring for applying pressure between said grounding ring and both of said head member and said rigid conduit section providing electrical continuity between said head member and said grounding ring and sliding electrical continuity between said grounding ring and said rigid conduit section; and
   f. motion limiting means including a longitudinal extension of said grounding ring limiting the longitudinal motion of said rigid conduit section in the direction to remove it from said head member so that said electrical continuity between said head member and said rigid conduit section is not endangered.

2. The combination as set forth in claim 1 wherein said head member includes stop means for limiting the pressure between said grounding ring and said head member and said rigid conduit section when said head member is coupled to said body member by said head coupling means.

3. The combination as set forth in claim 1 wherein said head member includes a recess for retaining an O-ring in sealing contact with said head member and said rigid conduit section to provide a rain-tight seal between said rigid conduit section and said head member.

4. The combination as set forth in claim 1 wherein said motion limiting means further comprises:
   a. a bushing coupled to the end of said rigid conduit member which is contained within said body member; and
   b. and wherein said motion limiting means co-acts with said bushing and said head member.

5. The combination as set forth in claim 1 wherein said grounding ring is in the shape of a right circular cylinder with a longitudinal slot and an end of said right circular cylinder is bent over at a substantial angle to the axis of the cylinder and extends away therefrom.

6. The combination as set forth in claim 5 and including a plurality of slits through said bent over portion.

7. The combination as set forth in claim 5 wherein said pressure producing means comprises a compression grommet applying a pressure between said cylindrical portion of said grounding ring and said rigid conduit member and between said bent over portion of said grounding ring and said head member.

8. The combination as set forth in claim 7 and including stop means in said head member limiting the pressure applied by said compression grommet to said grounding ring.

9. The combination as set forth in claim 8 wherein said motion limiting means includes a bushing coupled to the end of said rigid conduit member which is contained within said body member.

* * * * *